United States Patent
Lee et al.

(10) Patent No.: US 11,428,947 B2
(45) Date of Patent: Aug. 30, 2022

(54) SUPER-RESOLUTION HOLOGRAPHIC MICROSCOPE

(71) Applicant: SAMSUNG ELECTRONICS CO., LTD., Suwon-si (KR)

(72) Inventors: Myungjun Lee, Seongnam-si (KR); Seungbeom Park, Gwangju (KR); Jaehyeon Son, Hwaseong-si (KR); Jaehwang Jung, Hwaseong-si (KR); Taewan Kim, Yongin-si (KR); Kyungwon Yun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 16/848,169

(22) Filed: Apr. 14, 2020

(65) Prior Publication Data

US 2021/0080743 A1 Mar. 18, 2021

(30) Foreign Application Priority Data

Sep. 18, 2019 (KR) .................... 10-2019-0114956

(51) Int. Cl.
*G02B 27/58* (2006.01)
*G03H 1/00* (2006.01)
(Continued)

(52) U.S. Cl.
CPC .............. *G02B 27/58* (2013.01); *G01B 11/24* (2013.01); *G02B 21/26* (2013.01); *G02B 21/367* (2013.01);
(Continued)

(58) Field of Classification Search
CPC ...... G03H 1/0005; G03H 1/0443; G03H 1/16; G03H 2001/005; G03H 2223/23;
(Continued)

(56) References Cited

U.S. PATENT DOCUMENTS 5,170,063 A * 12/1992 Miyazaki ......... G01N 21/95623
250/559.45
6,100,978 A * 8/2000 Naulleau ............. G03F 7/70591
356/498

(Continued)

FOREIGN PATENT DOCUMENTS

KR 10-2019-0072020 A 6/2019

OTHER PUBLICATIONS

Guizar-Sicairos, et al., "Efficient subpixel image registration algorithms", Optics Letters, Jan. 2008, vol. 33, Issue 2, 3 pages total.

*Primary Examiner* — Boubacar Abdou Tchoussou
(74) *Attorney, Agent, or Firm* — Sughrue Mion, PLLC

(57) ABSTRACT

A super-resolution holographic microscope includes a light source configured to emit input light, a diffraction grating configured to split the input light into first diffracted light and second diffracted light, a mirror configured to reflect the first diffracted light, a wafer stage arranged on an optical path of the second diffracted light and on which a wafer is configured to be arranged, and a camera configured to receive the first diffracted light that is reflected by the mirror and the second diffracted light that is reflected by the wafer to generate a plurality of hologram images of the wafer.

19 Claims, 18 Drawing Sheets

(51) Int. Cl.
  *G02B 27/10* (2006.01)
  *G02B 21/26* (2006.01)
  *G02B 21/36* (2006.01)
  *G03H 1/16* (2006.01)
  *G01B 11/24* (2006.01)
  *G03H 1/04* (2006.01)

(52) U.S. Cl.
  CPC ....... *G02B 27/1086* (2013.01); *G03H 1/0005* (2013.01); *G03H 1/0443* (2013.01); *G03H 1/16* (2013.01); *G03H 2001/005* (2013.01); *G03H 2223/23* (2013.01); *G03H 2226/02* (2013.01)

(58) Field of Classification Search
  CPC .. G03H 2226/02; G03H 1/0866; G02B 27/58; G02B 21/26; G02B 21/367; G02B 27/1086; G01B 11/24
  See application file for complete search history.

(56) References Cited

U.S. PATENT DOCUMENTS

| | | | |
|---|---|---|---|
| 6,262,818 B1 * | 7/2001 | Cuche | G03H 1/0443 359/10 |
| 7,995,627 B2 * | 8/2011 | Bouma | G02B 27/48 372/20 |
| 8,194,124 B2 * | 6/2012 | Asundi | G03H 1/0443 348/79 |
| 8,363,316 B2 | 1/2013 | Asundi et al. | |
| 8,937,722 B2 * | 1/2015 | Cotte | G02B 21/365 356/457 |
| 9,243,901 B2 * | 1/2016 | Goodwin | G02B 27/4255 |
| 9,581,967 B1 | 2/2017 | Krause | |
| 9,632,039 B2 | 4/2017 | Den Boef et al. | |
| 9,632,299 B2 | 4/2017 | Sun et al. | |
| 10,346,964 B2 | 7/2019 | Ebstein | |
| 2004/0130762 A1 * | 7/2004 | Thomas | G01B 9/021 359/15 |
| 2008/0137933 A1 * | 6/2008 | Kim | G03H 1/0866 382/131 |
| 2009/0091811 A1 * | 4/2009 | Asundi | G03H 1/0866 359/15 |
| 2009/0290156 A1 * | 11/2009 | Popescu | G02B 21/008 356/338 |
| 2010/0254414 A1 * | 10/2010 | Bouma | G01J 3/10 372/20 |
| 2013/0057869 A1 * | 3/2013 | Cotte | G02B 21/365 356/457 |
| 2014/0049761 A1 * | 2/2014 | Goodwin | G01B 11/2527 355/56 |
| 2017/0185036 A1 | 6/2017 | Brooker et al. | |
| 2017/0322151 A1 | 11/2017 | Kolman et al. | |
| 2019/0206047 A1 | 7/2019 | Honda et al. | |
| 2019/0369557 A1 | 12/2019 | Lee et al. | |

* cited by examiner

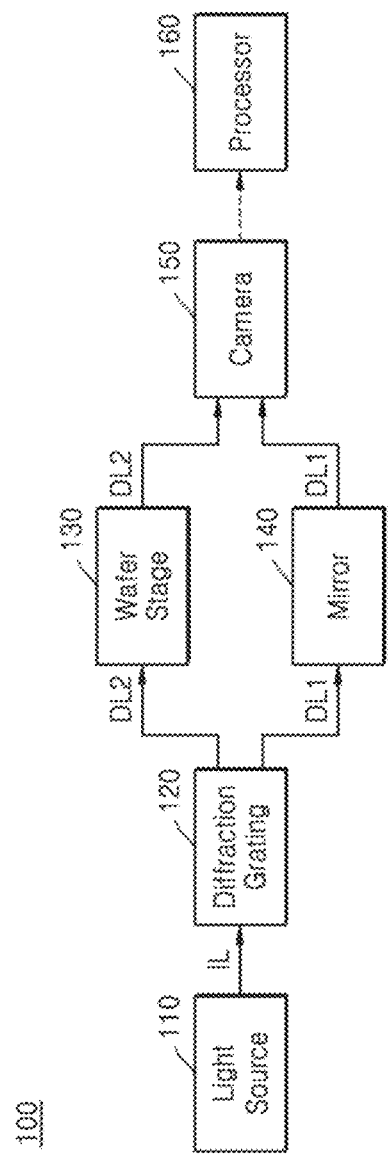

SUPER-RESOLUTION HOLOGRAPHIC MICROSCOPE

CROSS-REFERENCE TO THE RELATED APPLICATION

This application claims priority from Korean Patent Application No. 10-2019-0114956, filed on Sep. 18, 2019 in the Korean Intellectual Property Office, the disclosure of which is incorporated herein in its entirety by reference.

BACKGROUND

1. Field

One or more example embodiments of the present disclosure relate to a super-resolution holographic microscope, and more particularly, to a super-resolution holographic microscope which may be used for inspections of semiconductor devices and wafers.

2. Description of Related Art

A manufacturing operation of a semiconductor device includes a destructive inspection and a non-destructive inspection. Since the non-destructive inspection does not damage the semiconductor device, the non-destructive has advantages that the inspection speed is faster and a total inspection is possible. A representative non-destructive inspection is an optical inspection, including electron microscope observation, ellipsometry, or the like, configured to inspect wafers. An electron microscope is a device using an electron beam and an electron lens to produce an enlarged image of an object. The electron microscope has advantages that a resolution limit of an optical microscope may be overcome and micro-observation may be possible.

Ellipsometry is a technique of obtaining information about a sample by analyzing a change in polarization of reflected light reflected from the sample, for example, a surface of a wafer. In the ellipsometry, a polarization state of reflected light may vary according to optical properties, for example, a refractive index, and respective thicknesses of layers formed on a wafer. Ellipsometry is a technique of obtaining physical information about the layers formed on a wafer based on a change in polarization of reflected light.

SUMMARY

One or more example embodiments provide a super-resolution holographic microscope with improved reliability.

According to an aspect of an example embodiment, there is provided a super-resolution holographic microscope including a light source configured to emit input light, a diffraction grating configured to split the input light into first light and second light, a mirror configured to reflect the first light, a wafer stage arranged on an optical path of the second light and on which a wafer is configured to be arranged, and a camera configured to receive the first light reflected by the mirror and the second light reflected by the wafer to generate a plurality of hologram images of the wafer.

According to another aspect of an example embodiment, there is provided a super-resolution holographic microscope including a light source configured to generate input light and emit the input light that is generated, a diffraction grating configured to receive the input light and output first diffracted light and second diffracted light, a mirror configured to reflect the first diffracted light, a wafer stage arranged on an optical path of the second diffracted light and on which a wafer is configured to be arranged, a camera configured to receive the first diffracted light reflected by the mirror and the second diffracted light reflected by the wafer to generate a plurality of hologram images, and a processor configured to generate a super-resolution hologram image based on the plurality of hologram images, wherein a lens is not arranged on each of an optical path of the input light, an optical path of the first diffracted light, and the optical path of the second diffracted light.

According to another aspect of an example embodiment, there is provided a super-resolution holographic microscope including a light source configured to generate input light and emit the input light that is generated, a diffraction grating configured to receive the input light and output first diffracted light and second diffracted light, a total-reflection mirror configured to reflect the first diffracted light, a wafer stage arranged on an optical path of the second diffracted light and on which a wafer is configured to be arranged, a camera configured to receive the first diffracted light reflected by the total-reflection mirror and the second diffracted light reflected by the wafer to generate a plurality of hologram images, and a processor configured to generate a super-resolution hologram image based on the plurality of hologram images, wherein a lens and a beam splitter are not arranged on each of an optical path of the input light, an optical path of the first diffracted light, and the optical path of the second diffracted light.

BRIEF DESCRIPTION OF THE DRAWINGS

The above and/or other objects, features and other advantages of example embodiments will be more clearly understood from the following detailed description taken in conjunction with the accompanying drawings, in which:

FIG. 1A is a schematic block diagram illustrating a super-resolution holographic microscope according to an example embodiment;

DETAILED DESCRIPTION OF THE EMBODIMENTS

Figure 1B:
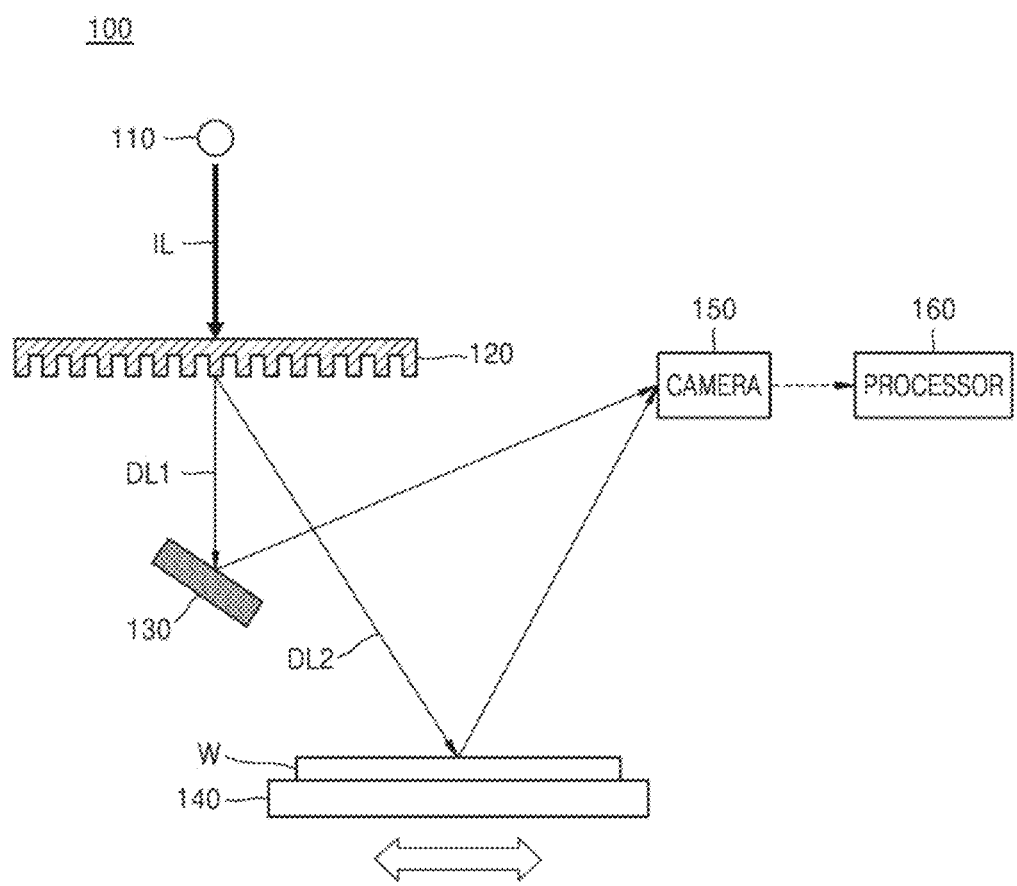
FIG. 1B is a schematic diagram illustrating a super-resolution holographic microscope according to an example embodiment.

Example embodiments will now be described more fully with reference to the accompanying drawings. Like reference numerals may denote like elements in different drawings, and redundant description thereof will be omitted.

FIG. 1A is a schematic block diagram illustrating a super-resolution holographic microscope 100 according to an example embodiment. FIG. 1B is a schematic diagram illustrating the super-resolution holographic microscope 100 according to an example embodiment.

Referring to FIGS. 1A to 1B, the super-resolution holographic microscope 100 may simultaneously provide sub-micron resolution and a very large field of view. Accordingly, a problem, that an inspection of a wafer W takes a long time due to miniaturization of a pattern thereof and turn-around time (TAT) is increased, may be solved. The super-resolution holographic microscope 100 may include a type of computational diffraction microscopy (CDM) system. The super-resolution holographic microscope 100 may generate a plurality of hologram images by using CDM technology. The super-resolution holographic microscope 100 may generate a super-resolution hologram image based on the plurality of hologram images. The super-resolution holographic microscope 100 may Fourier-transform the plurality of hologram images and generate a super-resolution hologram image of a wavenumber domain based on the Fourier-transformed plurality of hologram images. Then, the super-resolution holographic microscope 100 may Fourier-back-transform the super-resolution hologram image of the wavenumber domain to generate a super-resolution hologram image on a real domain. The super-resolution holographic microscope 100 may reconstruct a super-resolution image by back-propagating the super-resolution hologram image on the real domain to an imaging plane of an object.

Herein, a hologram may include an image similarly representing a three-dimensional object that is substantially the same as a real object. To produce a hologram, light from a coherent light source may be split into two. Herein, coherency means that a phase between waves configuring input light IL remains substantially constant. One of the split pieces of light directly reaches a light-receiving element, and the other of the split pieces of light is reflected by a target object of which an image is to be obtained and reaches the light-receiving element. In this case, the light directly reaching the light-receiving element may be a reference beam, and the light reflected from the object and then reaching the light-receiving element may be an object beam. Since the object beam is light reflected from a surface of an object, a phase of the object beam may vary according to each position of the surface of the object where the object beam is reflected from. The reference beam and the object beam may interfere with each other and form an interference fringe, and an image configured by the interference fringe may be a hologram. A general image stores only light intensity, but a hologram image may store light intensity and phase information.

The super-resolution holographic microscope 100 may include a light source 110, a diffraction grating 120, a mirror 130, a wafer stage 140, a camera 150, and a processor 160.

The light source 110 may emit input light IL which is configured to inspect a wafer W optically and non-destructively. According to an example embodiment, the light source 110 may include a mono-chromatic point source. The light source 110 may include a light source having a discontinuous spectrum, such as a sodium lamp, a mercury lamp, or the like. According to an example embodiment, the light source 110 may include a laser that generates laser light. According to an example embodiment, the light source 110 may include at least one of a gas laser such as a He—Ne laser, a $CO_2$ laser, or the like, a solid-state laser such as a ruby laser, a yttrium aluminum garnet (YAG) laser, or the like, and a semiconductor laser such as a GaAs laser, a InP laser, or the like.

According to an example embodiment, the input light IL may include coherent light. The input light IL may include collimated light where a beamwidth of the input light IL is not substantially changed when the input light IL is progressed.

However, the light source 110 is not limited thereto, and the light source 110 may emit light of a set wavelength band. In this case, a frequency-selective element, such as a filter or an additional diffraction grating, may be further arranged between the light source 110 and the diffraction grating 120.

According to an example embodiment as illustrated in FIG. 1A, the diffraction grating 120 may be a transmissive-type. The diffraction grating 120 is an optical element that may split the input light IL into a plurality of diffracted lights DL1 and DL2 traveling in directions different from each other. The diffraction grating 120 may have, for example, a lattice structure in which elements having different refractive indices and extending in a direction are alternately and periodically arranged. Light incident on different points of the diffraction grating 120 may respectively become a new point wave source and may be formed as a local maximum point due to constructive interference of wavelengths transmitted from each point source and a local minimum point due to destructive interference of wavelengths transmitted from each point source. Accordingly, one input light IL may be split into diffracted pieces of light DL1 and DL2. Diffraction properties, for example, an intensity and a travel direction of each of the pieces of diffracted light, by the diffraction grating 120 may depend on a spacing between grids included in the diffraction grating 120 and a wavelength of light.

First piece of diffracted light DL1 may be zeroth-order diffracted light. Second diffracted light DL2 may be first-order diffracted light. The negative(−)-first-order diffracted light may be further formed on an opposite side of the second piece of diffracted light DL2 with the first piece of diffracted light DL1 between the second piece of diffracted light DL2 and the negative(−)-order diffracted light. Although only the first piece of diffracted light DL1 and the second piece of diffracted light DL2 are shown in FIG. 1B, higher-order, for example, third-order or higher, diffracted pieces of light may be formed according to a structure of the diffraction grating 120 and a wavelength of the input light IL. Beam widths of the first piece of diffracted light DL1 and the second piece of diffracted light DL2, and third piece of diffracted light DL3 (see FIG. 2A) and fourth piece of diffracted light DL4 (see FIG. 2B) to be described below may be substantially constant according to operations thereof. That is, the first piece of diffracted light DL1 and the second piece of diffracted light DL2, and the third piece of diffracted light DL3 (see FIG. 2A) and the fourth piece of diffracted light DL4 (see FIG. 2B) may be pieces of light which are not focused.

According to an example embodiment, intensities of the first piece of diffracted light DL1 and the second piece of diffracted light DL2 may be adjusted according to a surface profile of an unit cell of a periodic structure of the diffraction grating 120. According to an example embodiment, the intensities of the first piece of diffracted light DL1 and the second piece of diffracted light DL2 may be substantially equal to each other. However, embodiments are not limited thereto. For example, the intensity of the first piece of diffracted light DL1 may be greater or less than the intensity of the second piece of diffracted light DL2, according to the surface profile of the unit cell of the diffraction grating 120.

The first piece of diffracted light DL1 may be a reference beam forming a hologram image. The first piece of diffracted light DL1 may be reflected by the mirror 130 and be incident on the camera 150. The mirror 130 is an element configured to reflect light and may be a total-reflection mirror. However, the mirror 130 is not limited thereto.

The second piece of diffracted light DL2 may be reflected or diffracted by a wafer W arranged on the wafer stage 140. The reflected or diffracted second piece of diffracted light DL2 may be incident on the camera 150. The second piece of diffracted light DL2 may be an object beam forming a hologram image.

The wafer stage 140 may be an apparatus configured to fix and support the wafer W. The wafer stage 140 may include, for example, a chuck such as a vacuum chuck, an electrostatic chuck, or the like. The wafer stage 140 may horizontally move the wafer W in a direction perpendicular to a normal of an upper surface of the wafer W. The wafer stage 140 may horizontally move the wafer W at a sub-pixel level such that a portion, which is captured by a first pixel, of an image captured by the camera 150 before the movement of the wafer W is also captured by the first pixel after the movement of the wafer W.

The first piece of diffracted light DL1 and the second piece of diffracted light DL2 incident on the camera 150 may interfere with each other to generate a hologram image. For example, the camera 150 may be a charge-coupled device (CCD) camera or a CMOS image sensor (CIS) camera. The camera 150 may generate an electrical signal corresponding to the hologram image generated by the first piece of diffracted light DL1 and the second piece of diffracted light DL2.

According to an example embodiment, a lens may not be arranged on an optical path between the light source 110 and the camera 150. The super-resolution holographic microscope 100 may be configured as a lens-free optical system. Accordingly, the super-resolution holographic microscope 100 may have a relatively wide field of view. In addition, as the super-resolution holographic microscope 100 includes a digital imaging optical system, the super-resolution holographic microscope 100 may provide an image having a super-resolution exceeding a resolution limit determined by a pixel of the camera 150.

According to an example embodiment, a lens may not be arranged between the light source 110 and the diffraction grating 120. Accordingly, the input light IL emitted from the light source 110 may be first incident on the diffraction grating 120.

According to an example embodiment, a lens may not be arranged between the diffraction grating 120 and the mirror 130. Accordingly, the first piece of diffracted light DL1 generated by the diffraction grating 120 may first reach the mirror 130.

According to an example embodiment, a lens may not be arranged between the mirror 130 and the camera 150. Accordingly, the first piece of diffracted light DL1 reflected by the mirror 130 may first reach the camera 150.

According to an example embodiment, a lens may not be arranged between the diffraction grating 120 and the wafer W or the wafer stage 140. Accordingly, the second piece of diffracted light DL2 generated by the diffraction grating 120 may first reach the wafer W.

According to an example embodiment, a lens may not be arranged between the wafer W or the wafer stage 140 and the camera 150. Accordingly, the second piece of diffracted light DL2 reflected by the wafer W or refracted by the wafer W may first reach the camera 150.

According to an example embodiment, the super-resolution holographic microscope 100 may not include a beam splitter splitting light to form a hologram image. Since the super-resolution holographic microscope 100 does not include the beam splitter, noise generated by multiple reflection inside the beam splitter may be prevented.

The processor 160 may perform a certain operation on the hologram image generated by the camera 150 to generate a super-resolution image. Operations to be performed by the processor 160 may include, for example, generating a super-resolution hologram image based on a plurality of hologram images and generating a super-resolution image through back-propagation reconstruction.

The generating of the super-resolution hologram image based on the plurality of hologram images may include an operation of Fourier-transforming a plurality of hologram images obtained by a sub-pixel shift, an operation of extracting, for each of the plurality of Fourier-transformed wavenumber domain hologram images, a spectral coefficient of signals in a high-wavenumber band having wavenumbers that are equal to or greater than a sampling wavenumber and aliased into an image of low frequency, and an operation of generating a super-resolution hologram image based on the spectral coefficient of the high-wavenumber signal which may vary according to a degree and a direction of a sub-pixel shift.

When the direction and the degree of the sub-pixel shift generating each of the plurality of hologram images are clearly known, a method of least squares may be used to obtain a spectral coefficient of signals in an aliased high-wavenumber band and a super-resolution image may be generated based on the spectral coefficient. This series of operations is referred to as aliasing-based bandwidth expansion. The series of operations including the aliasing-based bandwidth expansion will be described in more detail with reference to FIGS. 7 to 12.

According to an example embodiment, the processor 160 may include a computing device such as a workstation computer, a desktop computer, a laptop computer, a tablet computer, or the like. The processor 160 may include a simple controller, a microprocessor, a complex processor, such as a central processing unit (CPU), a graphics processing unit (GPU), or the like, a processor configured by software, dedicated hardware, or firmware. For example, the processor 160 may be implemented by a general-purpose computer or application-specific hardware such as digital signal processor (DSP), a field programmable gate array (FPGA), an application specific integrated circuit (ASIC), or the like.

According to an example embodiment, an operation of the processor 160 may be implemented as instructions stored on a computer-readable recording medium that may be read and executed by one or more processors. Herein, the computer-readable medium may include any mechanism storing and/or transmitting information in a form readable by a machine, for example, a computing device. For example, the computer-readable medium may include read only memory (ROM), random access memory (RAM), a magnetic disk storage medium, an optical storage medium, flash memory devices, electrical, optical, acoustical or other forms of radio signals, for example, carrier waves, an infrared signal, a digital signal, or the like, and other any signals.

The processor 160 may include firmware, software, routines, and instructions performing the above-stated operation. For example, the processor 160 may be implemented by software configured to generate a super-resolution hologram image, generate a back-propagation reconstructed image, and perform an operation to generate an image through phase extraction.

An operation of the processor 160 may result from a computing device, a processor, a controller, or other devices executing firmware, software, a routine, instructions, or the like.

According to an example embodiment, the super-resolution holographic microscope 100 may inspect structures, defects, or the like formed on a wafer. According to an example embodiment, the super-resolution holographic microscope 100 may inspect defects such as particles and scratches, linewidths and pitches of formed patterns, and line-edge roughness (LER) of the patterns. According to an example embodiment, the super-resolution holographic microscope 100 may generate an image to generate a model function and an overlay function.

In an example embodiment, the super-resolution holographic microscope 100 may perform an after development inspection (ADI). In another example embodiment, the super-resolution holographic microscope 100 may perform an after etch inspection. In another example embodiment, the super-resolution holographic microscope 100 may perform an after cleaning inspection on the wafer W according to an etching operation.

Figure 2A:
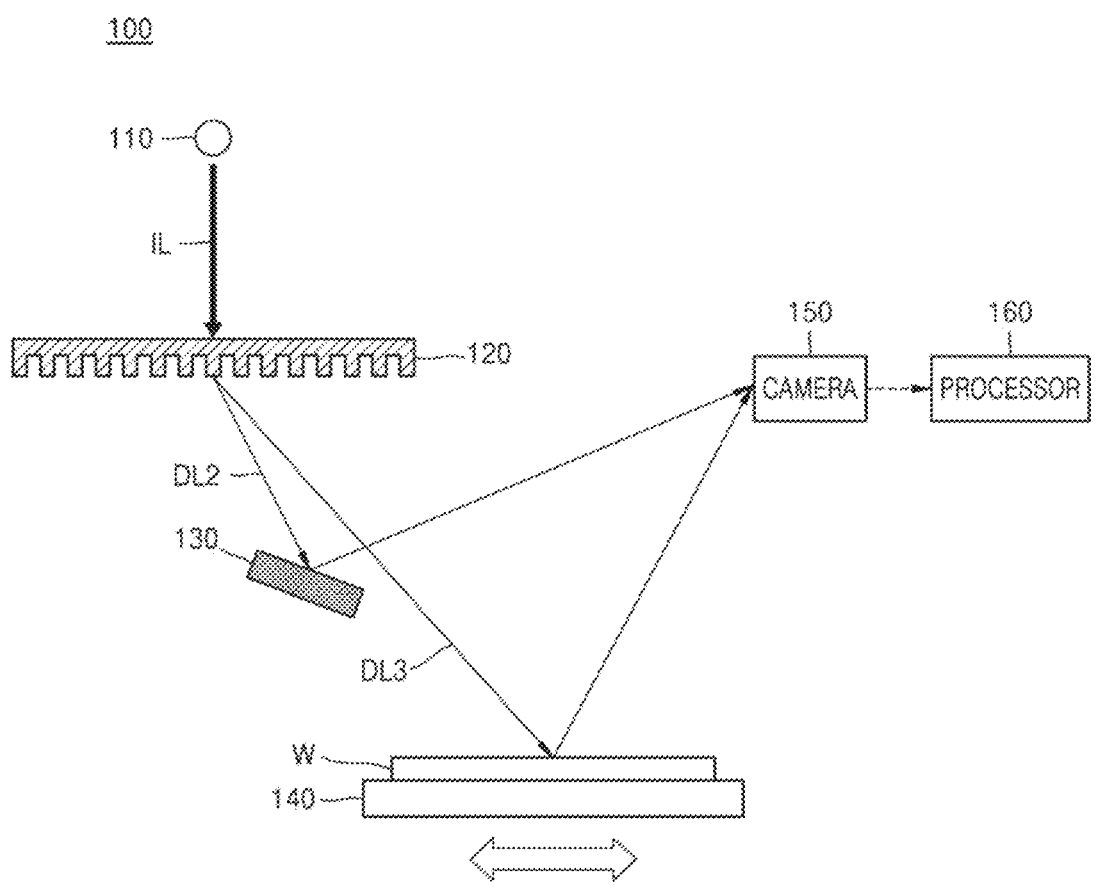
FIGS. 2A to 6 are diagrams illustrating a super-resolution holographic microscope according to another example embodiment.
Figure 2B:
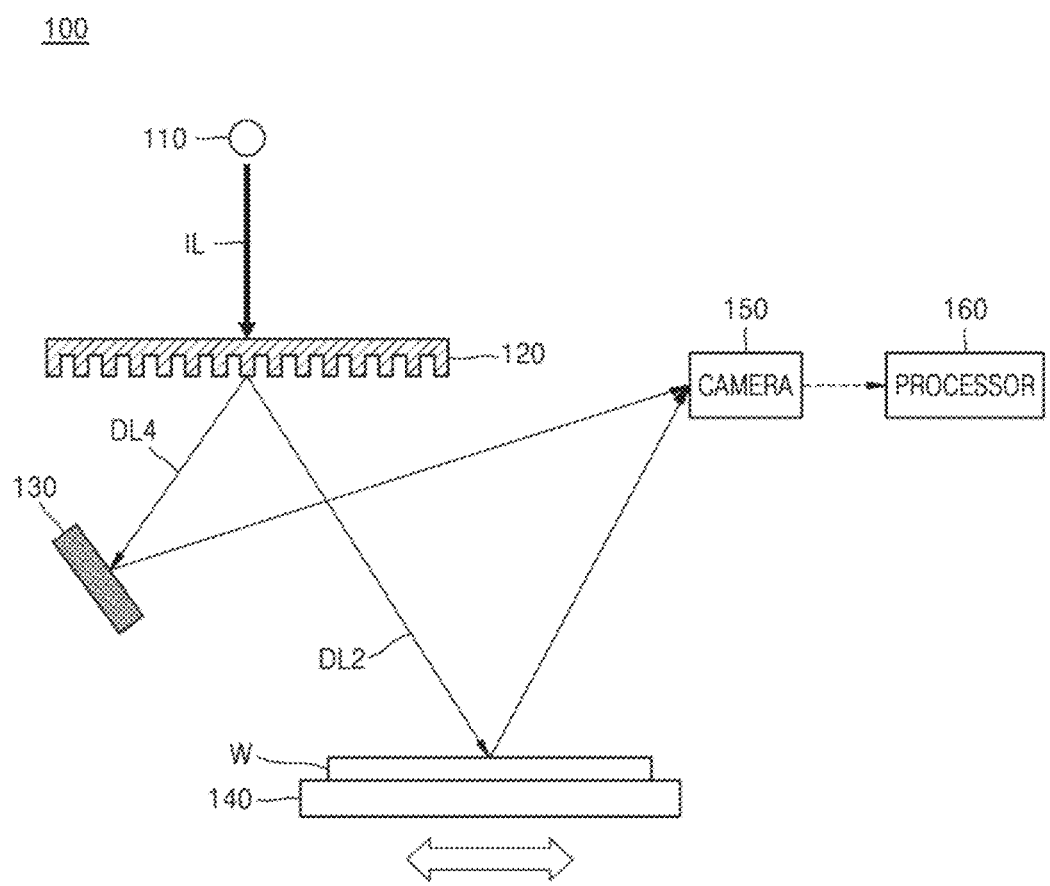
Figure 2C:
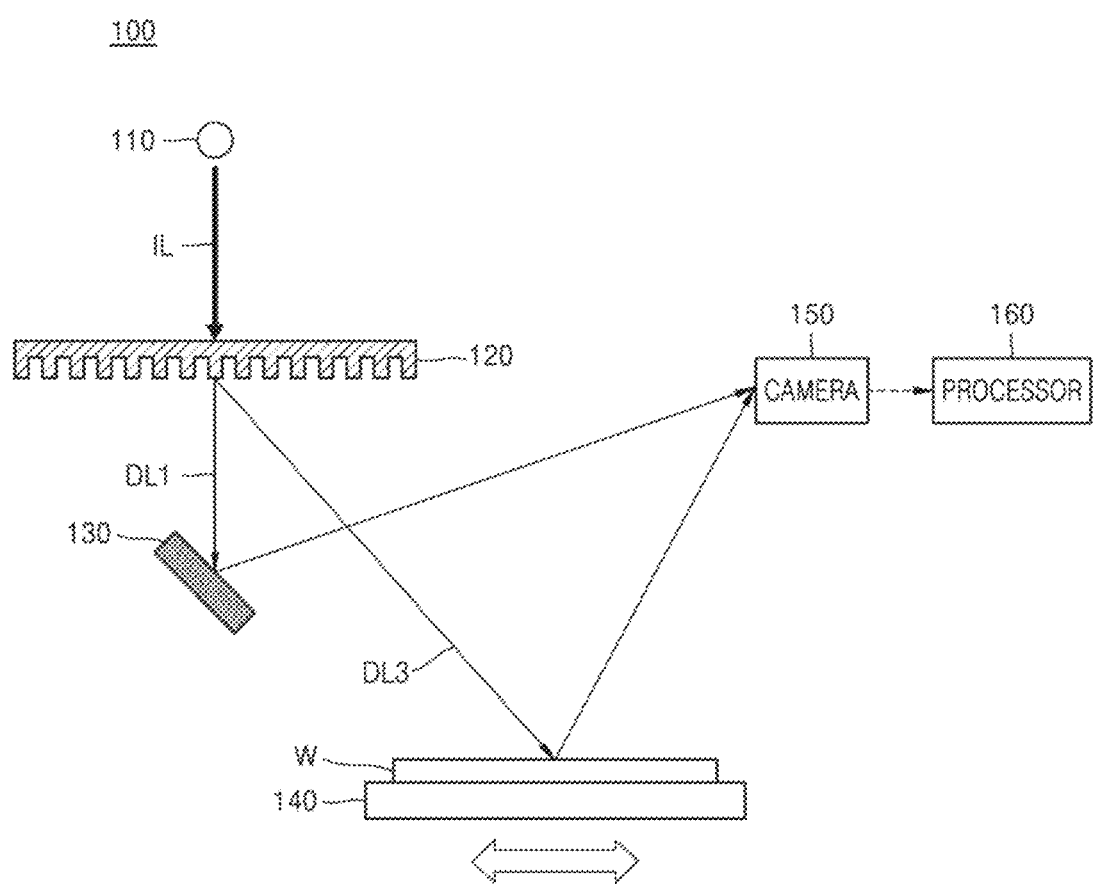

FIGS. 2A to 2C are diagrams illustrating a super-resolution holographic microscope 100 according to example embodiments.

For convenience of explanation, descriptions already given with reference to FIGS. 1A and 1B will be omitted and differences thereof will be mainly described.

Referring to FIG. 2A, the first piece of diffracted light DL1 (see FIG. 1B), which is the zeroth-order diffracted light, is omitted, and the second piece of diffracted light DL2, which is the first-order diffracted light, and third piece of diffracted light DL3, which is the second-order diffracted light, are shown.

According to an example embodiment, the second piece of diffracted light DL2 may be reflected by the mirror 130 and be incident on the camera 150. In the example embodiment, the second piece of diffracted light DL2 may be a reference beam forming a hologram image.

According to an example embodiment, the third piece of diffracted light DL3 may be reflected or refracted by the wafer W and be incident on the camera 150. In the example embodiment, the third piece of diffracted light DL3 may be an object beam forming a hologram image.

According to an example embodiment, the second piece of diffracted light DL2 and the third piece of diffracted light DL3 may have substantially the same intensity as each other. However, embodiments are not limited thereto. The second piece of diffracted light DL2 may have a greater intensity than that of the third diffracted light DL3, or the second piece of diffracted light DL2 may have an intensity less than that of the third piece of diffracted light DL3. In addition, the second piece of diffracted light DL2 and the third piece of diffracted light DL3, which are the first-order diffracted light and the second-order diffracted light in order respectively, may have a greater intensity than that of the zeroth-order diffracted light, but embodiments are not limited thereto.

Referring to FIG. 2B, the second piece of diffracted light DL2, which is the first-order diffracted light, and fourth piece of diffracted light DL4, which is negative(−)-first-order diffracted light, are shown.

According to an example embodiment, the fourth piece of diffracted light DL4 may be reflected by the mirror 130 and be incident on the camera 150. In the example embodiment, the fourth piece of diffracted light DL4 may be a reference beam forming a hologram image.

According to an example embodiment, the second piece of diffracted light DL2 may be reflected or refracted by the wafer W and be incident on the camera 150. In the example embodiment, the second piece of diffracted light DL2 may be an object beam forming a hologram image.

Referring to FIG. 2C, the first piece of diffracted light DL1, which is the zeroth-order diffracted light, may be a reference beam, and the third piece of diffracted light DL3, which is the second-order diffracted light, may be an object beam.

The uses of the pieces of diffracted light described with reference to FIGS. 1B to 2C are for illustrative purposes and are not limiting in any sense. According to an example embodiment, one of the pieces of diffracted light spilt by the diffraction grating 120 may be a reference beam, and the other one may be an object beam.

Figure 3:
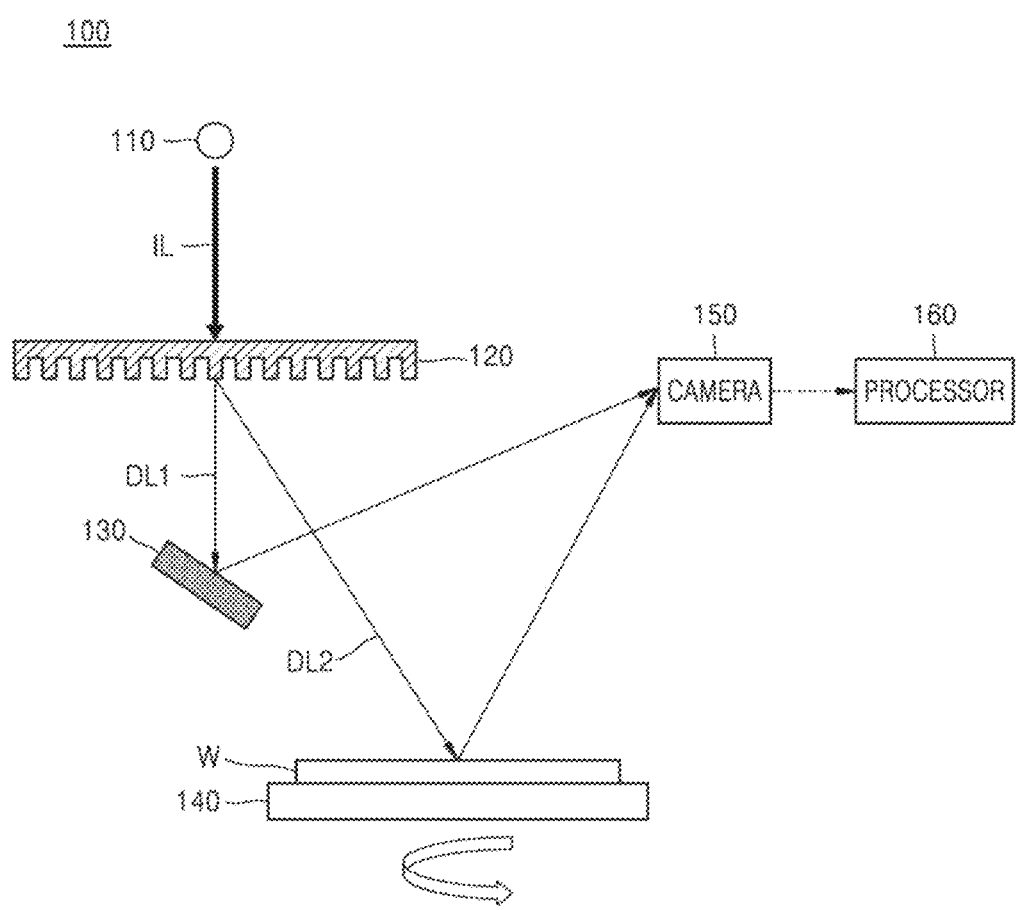

FIG. 3 is a diagram illustrating the super-resolution holographic microscope 100 according to another example embodiment.

For convenience of explanation, descriptions already given with reference to FIGS. 1A and 1B will be omitted and differences thereof will be mainly described.

Referring to FIG. 3, the wafer stage 140 may rotate the wafer W. The wafer W may be rotated to have various angles of deviation with respect to a central axis passing through a center of the wafer W and perpendicular to an upper surface of the wafer W. According to an example embodiment, a plurality of hologram images may be generated according to the rotation of the wafer W.

Figure 4:
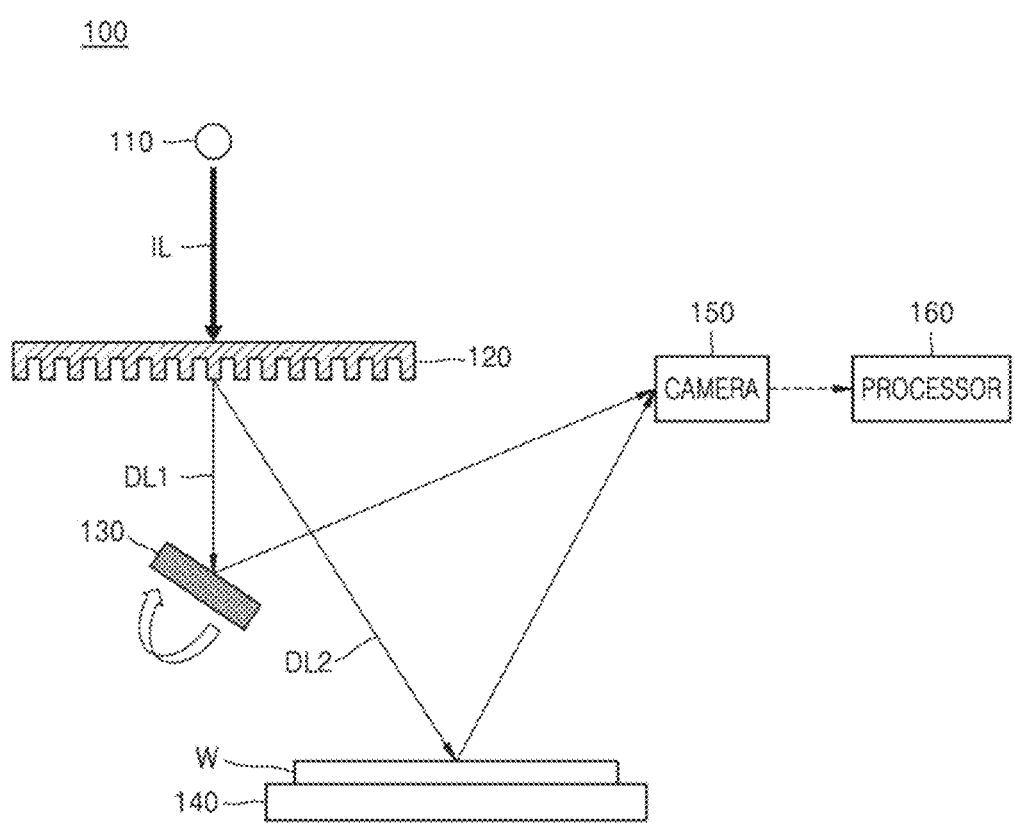

FIG. 4 is a diagram illustrating the super-resolution holographic microscope 100 according to another example embodiment.

For convenience of explanation, descriptions already given with reference to FIGS. 1A and 1B will be omitted and differences thereof will be mainly described.

Referring to FIG. 4, the mirror 130 may rotate. According to an example embodiment, the mirror 130 may be connected to a certain rotation driving device and may diffract incident light at various angles. According to an example embodiment, a plurality of hologram images may be generated according to the rotation of the mirror 130.

Figure 5A:
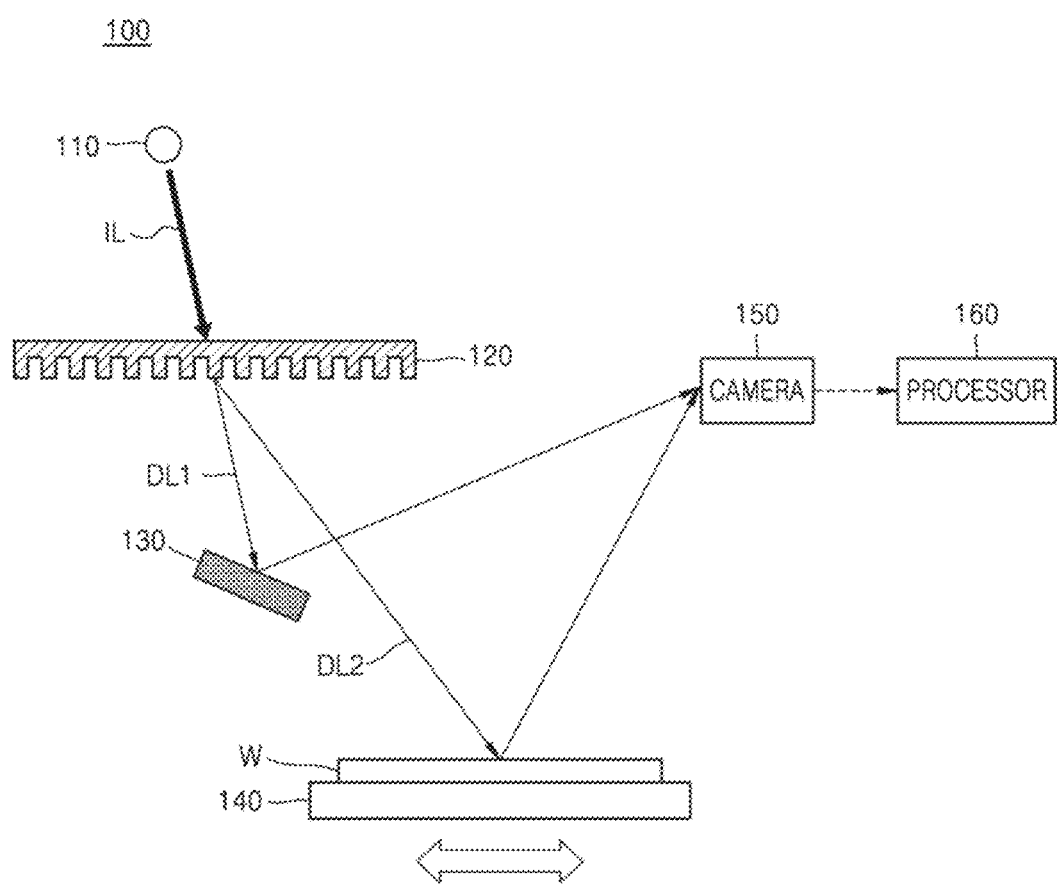
Figure 5B:
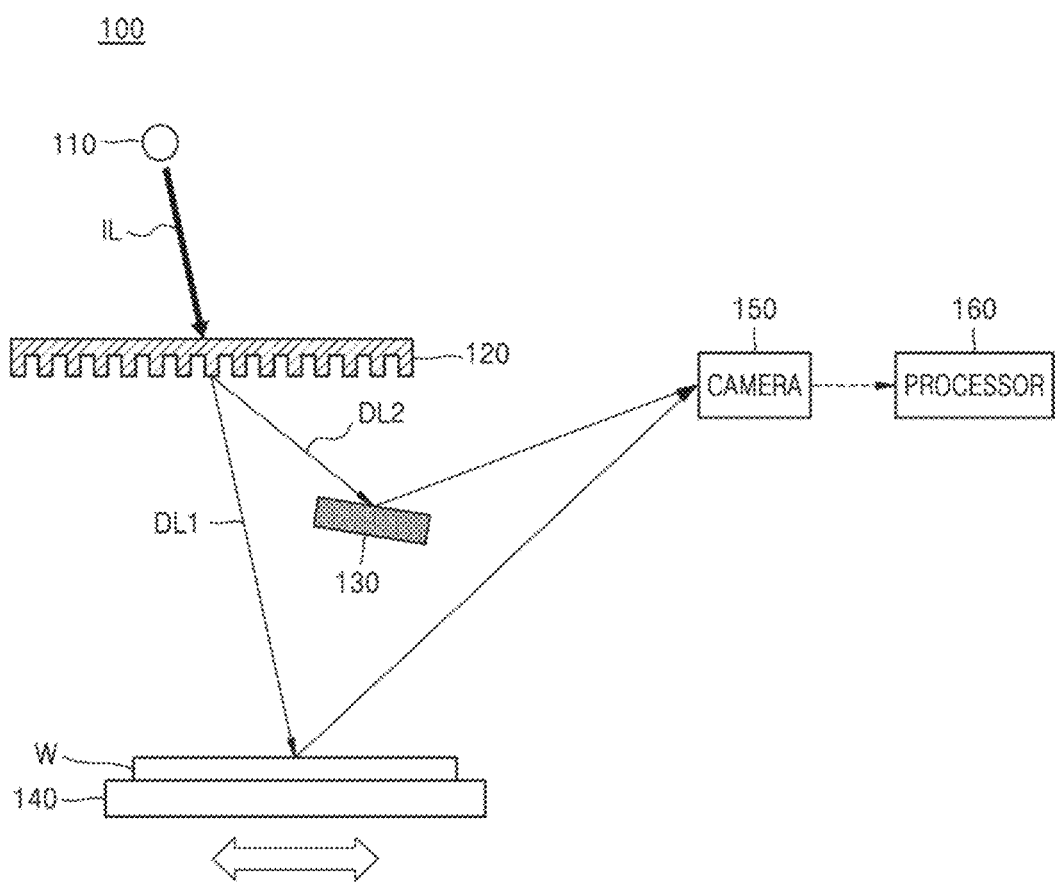

FIGS. 5A and 5B are diagrams illustrating the super-resolution holographic microscope 100 according to example embodiments.

For convenience of explanation, descriptions already given with reference to FIGS. 1A and 1B will be omitted and differences thereof will be mainly described.

Referring to FIGS. 5A and 5B, each super-resolution holographic microscope 100 may include an inclining optical system. For example, the light source 110 may emit the input light IL at a direction oblique to a normal of the surface of the diffraction grating 120.

While the super-resolution holographic microscopes 100 include a vertical optical system described with reference to FIGS. 1B to 4, the super-resolution holographic microscopes 100 of FIGS. 5A and 5B may each include an inclining optical system.

In an example embodiment as illustrated in FIG. 5A, the first piece of diffracted light DL1, which is the zeroth-order diffracted light, may be a reference beam, and the second piece of diffracted light DL2, which is the first-order diffracted light, may be an object beam.

In an example embodiment as illustrated in FIG. 5B, the first piece of diffracted light DL1, which is the zeroth-order diffracted light, may be an object beam, and the second piece of diffracted light DL2, which is the first-order diffracted light, may be a reference beam.

Figure 6:
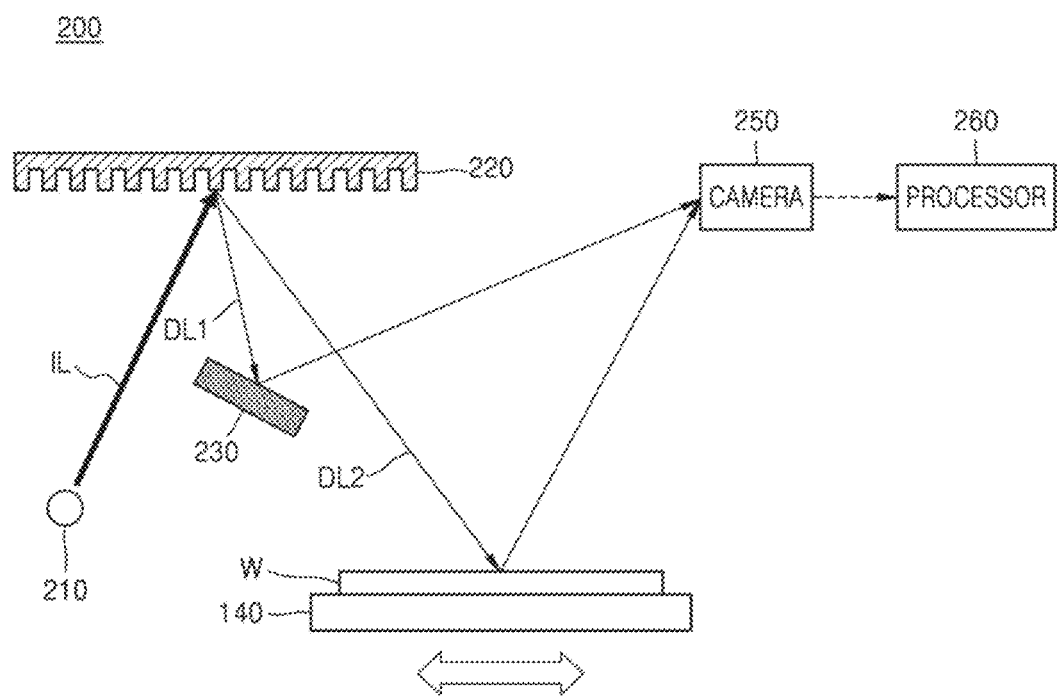

FIG. 6 is a diagram illustrating a super-resolution holographic microscope 200 according to another example embodiment.

Referring to FIG. 6, the super-resolution holographic microscope 200 may include a light source 210, a diffraction grating 220, a mirror 230, a wafer stage 240, a camera 250, and a processor 260.

Since the light source 210, the mirror 230, the wafer stage 240, the camera 250, and the processor 260 are respectively similar to the light source 110, the mirror 130, the wafer stage 140, the camera 150, and the processor 160 described with reference to FIGS. 1A to 1B, descriptions thereof in detail are omitted.

The diffraction grating 220 of FIG. 6 may be a reflective-type. The input light IL emitted by the light source 210 may be reflected and refracted by the diffraction grating 220 and generate at least the first piece of diffracted light DL1 and the second piece of diffracted light DL2.

The first piece of diffracted light DL1 is the zeroth-order diffracted light and may be a reference beam. The first piece of diffracted light DL1 may be reflected by the mirror 230 and be incident on the camera 250.

The second piece of diffracted light DL2 is the first-order diffracted light and may be an object beam. The second piece of diffracted light DL2 may be reflected or refracted by the wafer W and be incident on the camera 250.

FIG. 7A is a flowchart illustrating a wafer inspection method according to an example embodiment.

Figure 7:
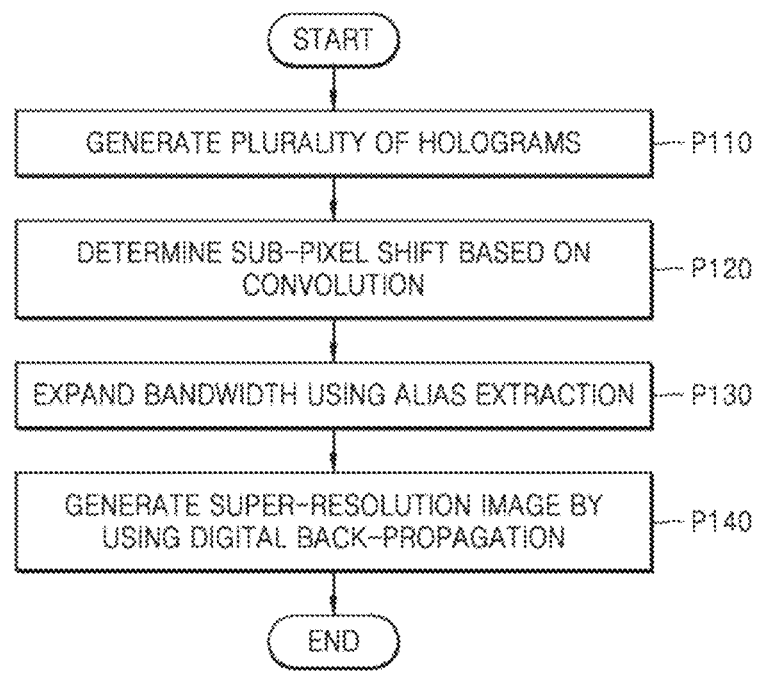
FIG. 7 is a flowchart illustrating a wafer inspection method according to another example embodiment.

Referring to FIG. 7, in operation P110, a plurality of hologram images may be generated.

According to an example embodiment, as shown in FIG. 1B, the plurality of hologram images corresponding to each position of the wafer W may be generated while horizontally moving the wafer W by sub-pixels. According to another example embodiment, as shown in FIG. 3, the plurality of hologram images corresponding to each angle of deviation of the wafer W may be generated while rotating the wafer W. According to another example embodiments, as shown in FIG. 4, a plurality of hologram images corresponding to each angle of the mirror 130 may be generated while rotating the mirror 130.

In operation P120, a sub-pixel shift may be determined based on convolution.

A convolution operation is an operation calculating a correlation between images of two physical quantities through a weighted sum of the two physical quantities. When a correlation between different hologram images generated by the sub-pixel shift is calculated, a peak is calculated from coordinates corresponding to the sub-pixel shift and the sub-pixel shift may be determined through the peak.

Then, in operation P130, a bandwidth may be expanded by using alias extraction.

Herein, when a sampling frequency is less than twice a maximum frequency of a signal in sampling, aliasing is a phenomenon in which output is distorted due to overlapping adjacent spectra.

In operation P110, a resolution of the plurality of hologram images is limited by a resolution of the camera 150. For example, when a horizontal length and a vertical length of a realizable pixel are about 1 μm each, a resolution limit may be about 1 μm in an optical system without reduction and enlargement by a lens. In this case, when images generated by the lens-free optical system are Fourier-transformed, a wavenumber range of signals Fourier-transformed may be limited in a range of about $-10^6$ $m^{-1}$ to about $10^6$ $m^{-1}$. Herein, the Fourier transform may be one of a fast Fourier transform (FFT), a discrete Fourier transform (DFT), and a short-time Fourier transform (SFT), but is not limited thereto.

FIGS. 8A to 10B are graphs illustrating in more detail bandwidth expansion using the alias extraction.

Figure 8A:
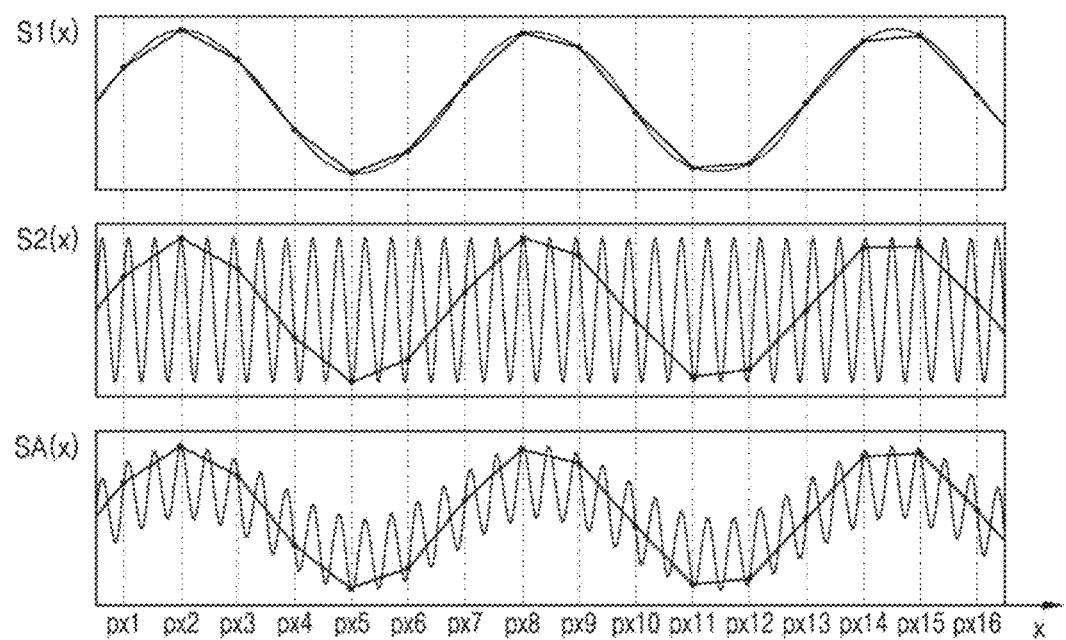
FIGS. 8A to 10B are graphs illustrating in more detail bandwidth expansion using alias extraction.

Referring to FIG. 8A, a first signal $S1(x)$ having a first wavenumber and a second signal $S2(x)$ having a second wavenumber are shown. The first signal $S1(x)$ and the second signal $S2(x)$ may be a function of a position coordinate x. Since each of pixels px1 to px16 has information with respect to an intensity of each image, a reciprocal of a distance between the pixels may be a sampling wavenumber. A sampling bandwidth, which is a section in which a signal spectrum exists, may be determined when a plurality of hologram images are Fourier-transformed to a wavenumber domain by the sampling wavenumber.

In the graph of FIG. 8A, the first wavenumber may be less than half of the sampling wavenumber, and the second wavenumber may be more than half of the sampling wavenumber. According to an example embodiment, a difference between the first wavenumber and the second wavenumber may be an integer multiple, for example, one time, of the sampling bandwidth. Accordingly, the second signal $S2(x)$ on each of the hologram images may be sampled as a signal of the first wavenumber, and an aliasing signal $SA(x)$, which is a signal adding up the first signal $S1(x)$ and the second signal $S2(x)$, may be detected.

Figure 8B:
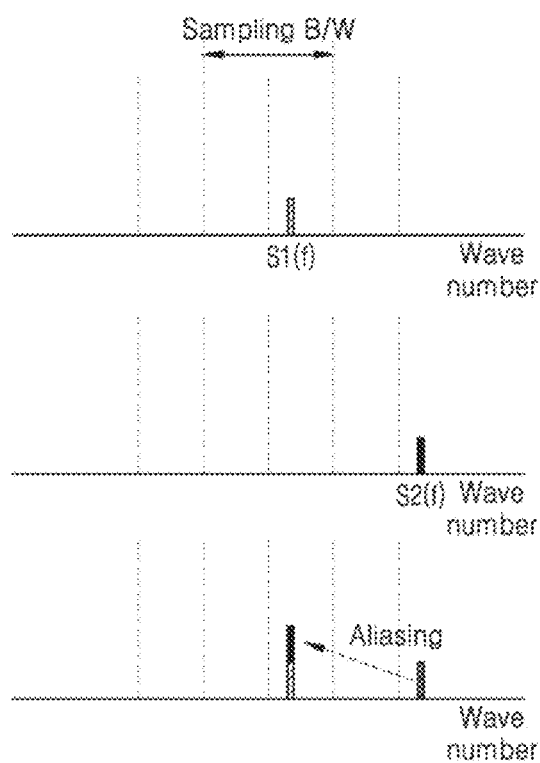

FIG. 8B illustrates that a first signal $S1(k)$ in a sampling wavenumber band in a wavenumber domain and a second signal $S2(k)$ outside the sampling wavenumber band are added by aliasing.

Figure 9:
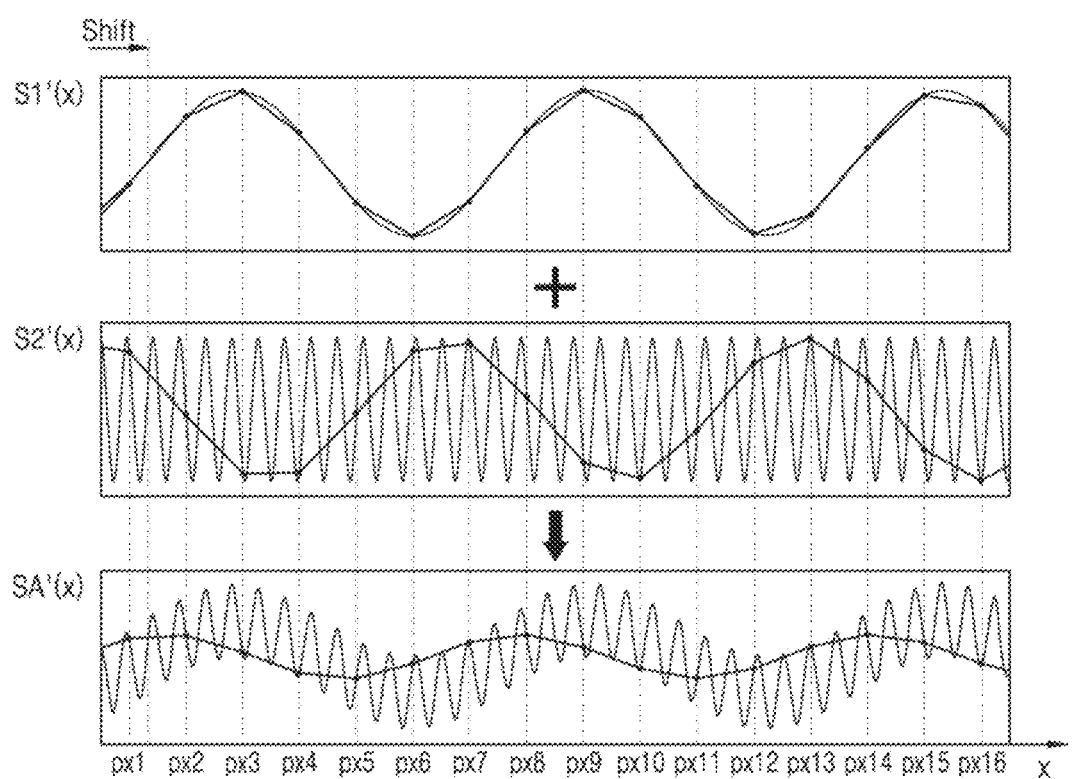

Referring to FIG. 9, compared to FIG. 8A, a first signal $S1'(x)$ and a second signal $S2'(x)$ after horizontally moving an inspection target by sub-pixels are shown. Since the first signal $S1'(X)$ and the second signal $S2'(x)$ have a difference in wavenumbers, the first signal $S1'(X)$ and the second signal $S2'(x)$ may be changed in different ways with respect to the horizontal move by sub-pixels. Accordingly, an amplitude of an aliasing signal $SA'(x)$ after the horizontal move by sub-pixels may be different from the aliasing signal $SA(x)$ (see FIG. 8A) before the horizontal move by sub-pixels.

Figure 10A:
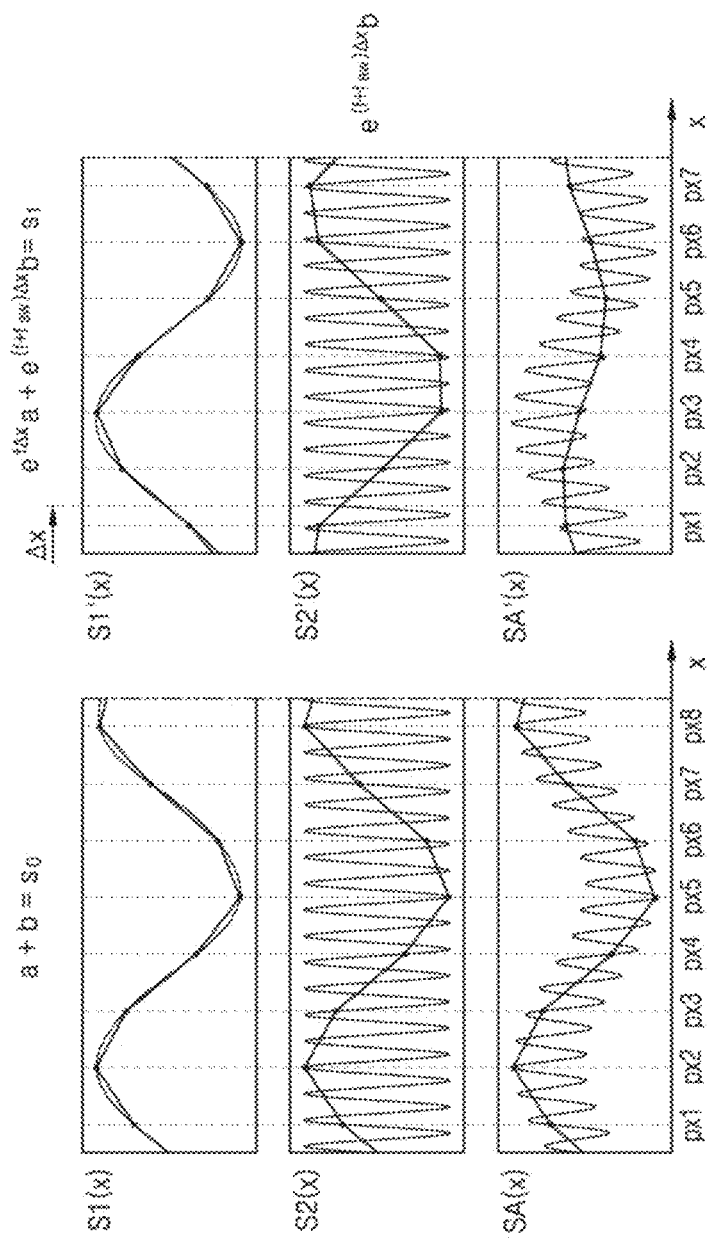

Referring to FIG. 10A, the first signal $S1(x)$, the second signal $S2(x)$, and the aliasing signal $SA(x)$, which are before the horizontal move by sub-pixels, and the first signal $S1'(x)$, the second pixel $S2'(x)$, and the aliasing signal $SA'(x)$, which are after the horizontal move by sub-pixels, are shown.

When coefficients of a wavenumber domain respectively obtained by Fourier-transforming the first signal $S1(x)$, the second signal $S2(x)$, and the aliasing signal $SA(x)$, which are before the horizontal move by sub-pixels, are a, b, and so, then a, b, and so satisfy Equation 1 below. Herein, a, b, and so are complex coefficients.

$$a+b=s0 \qquad \text{[Equation 1]}$$

Similarly, when coefficients of a wavenumber domain respectively obtained by Fourier-transforming the first signal $S1'(x)$, the second signal $S2'(x)$, and the aliasing signal $SA'(x)$, which are after sub-pixel-move by $\Delta x$, are a', b', and $s_0'$ in order, then a', b', and $s_0'$ satisfy Equation 2 below. Herein, a', b', and $s_0'$ are complex coefficients.

$$a'=ae^{k\Delta x}$$

$$b'=be^{(k+k_{BW})\Delta x}$$

$$a'+b'=s0' \qquad \text{[Equation 2]}$$

By combining Equation 1 and Equation 2, a and b may be calculated.

Figure 10B:
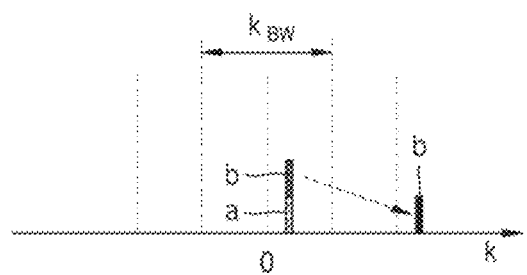

FIG. 10B conceptually illustrates that a signal of a wavenumber component greater than a sampling wavenumber k by $k_{BW}$ is extracted according to alias extraction.

Expanding a range of a wavenumber by a bandwidth of a wavenumber through an operation of a method similar to that described in FIGS. 8A to 10B is referred to as bandwidth expansion.

Figure 11:
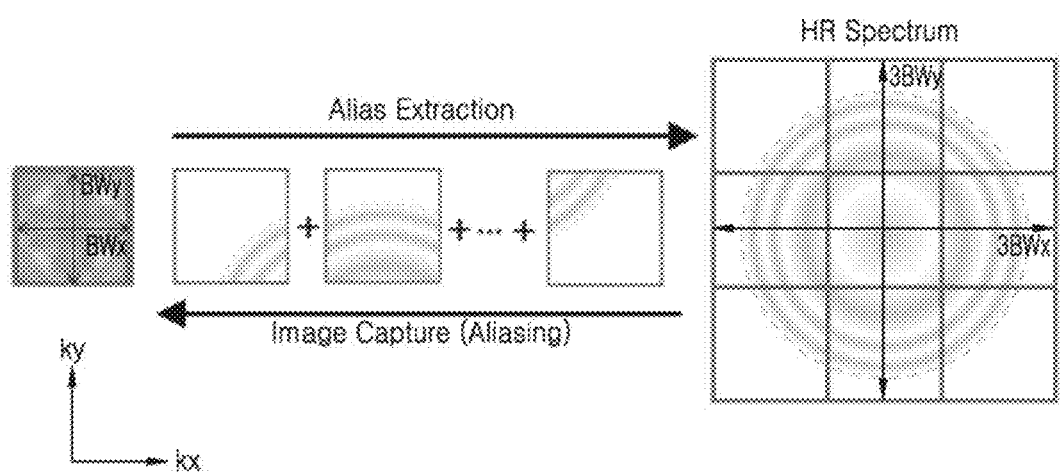
FIG. 11 is a concept map of alias extraction.

FIG. 11 is a conceptual drawing of alias extraction illustrating a signal distribution of a two-dimensional wavenumber domain.

In an example embodiment as illustrated in FIG. 11, an inspection band may have a first bandwidth BWx and a second bandwidth BWy in first direction kx direction and the second direction ky direction.

A super-resolution spectrum according to the alias extraction may have three times the first bandwidth 3BWx and three times the second bandwidth 3BWy by respectively expanding the first bandwidth BWx twice and the second bandwidth BWy twice in the first direction kx direction and the second direction ky direction. A super-resolution hologram image generated by the bandwidth expansion may have a resolution greater than a resolution according to a number of pixels of the camera 150, which is a condition limiting a resolution of a plurality of hologram images.

For convenience of explanation, in FIGS. 8 to 11, a bandwidth expansion by a greater wavenumber domain by a sampling bandwidth based on a sampling band is described. However, embodiments are not limited thereto. For example, bandwidth expansion may be implemented using components of integer multiples, for example, twice, triple, or more integer multiples of a bandwidth, of the bandwidth.

Accordingly, referring again to FIG. 7, in operation P140, an image may be generated by digital back-propagation.

Herein, the digital back-propagation is a technique back-performing a position of an object on a virtual physical optical system on the digital optical system to realize a real domain image of the object.

Figure 12:
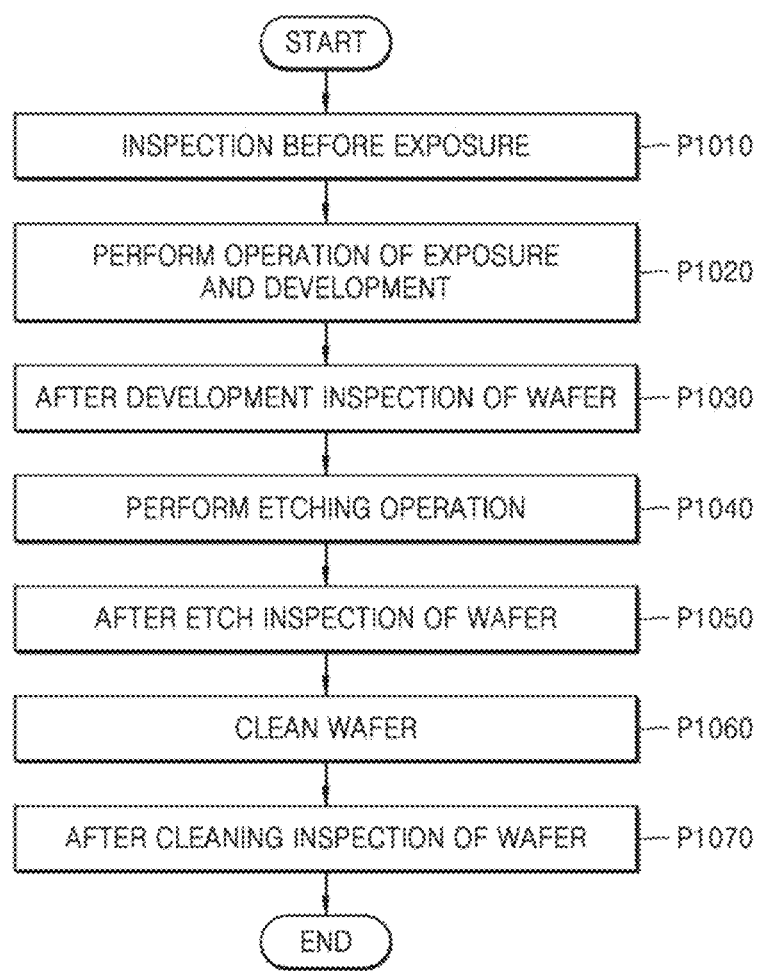
FIG. 12 is a flowchart illustrating a method of manufacturing a semiconductor device according to an example embodiment.

FIG. 12 is a flowchart illustrating a method of manufacturing a semiconductor device according to an example embodiment.

An operation of manufacturing a semiconductor device, performed in FIG. 12, may include, for example, a lithography operation. The lithography operation is an operation of transferring a circuit pattern previously formed on a lithographic mask to a substrate through exposure.

According to FIGS. 1B and 12, in operation P1010, an inspection before exposure may be performed.

The inspection before exposure may include, for example, identifying a position of an alignment mark included in patterns previously formed on the wafer W.

According to an example embodiment, a lithographic control system external to the super-resolution holographic microscope 100 may identify positions of alignment marks based on a super-resolution image generated by the processor 160. The generating of the super-resolution image may be substantially the same as described with reference to FIGS. 7 to 11.

According to an example embodiment, the lithographic control system may generate model functions indicating the identified positions of any patterns formed, based on the positions of the alignment marks. According to another example embodiment, the lithographic control system may directly identify a position of any patterns formed on the wafer W without generating the model function, based on the super-resolution image.

Accordingly, in operation P1020, an operation of exposure and development may be performed.

The operation of exposure and development may further include spin coating, soft bake, post-exposure bake, and hard bake. A photoresist layer may be provided by spin coating, and soft bake may be an operation removing an organic solvent remaining in the photoresist layer and strengthening a bond between the photoresist layer and the wafer W. The post-exposure bake may activate a photoactive compound (PAC) included in the photoresist layer, thereby reducing a curvature formed on the photoresist layer. The hard bake may be an operation increasing durability against etching and increasing an adhesive strength with respect to wafers W or an underlying layer by hardening the photoresist layer after performing the operation of exposure and development. The development operation may be an operation removing an exposure portion or a non-exposure portion of the photoresist layer.

Accordingly, in operation P1030, an after development inspection of the wafer W may be performed.

The ADI of the wafer W may include generating a super-resolution image of the wafer W including a photoresist pattern. The ADI inspects a shape and defects of the developed photoresist pattern. The lithographic control system may generate an overlay function through the ADI. Herein, the overlay function may be a function indicating misalignment between the photoresist pattern and a pattern of the underlying layer.

According to an example embodiment, the lithographic control system may directly identify an overlay on any positions on the wafer W without generating the overlay function, based on the super-resolution image.

According to an example embodiment, the lithographic control system may determine whether a circuit is defective based on the overlay function. For example, when a circuit defect occurs due to the misalignment between the photoresist pattern and the underlying layer, after removing the photoresist pattern, the exposure and development processes may be performed again in P1020. According to an example embodiment, defects formed in the lithographic mask may be detected based on the defects detected to be repeatedly transferred to each shot in the ADI.

In addition to the inspection of the defects such as particles and scratches, the ADI inspection may inspect the linewidths and pitches of formed patterns, and the LER of the patterns.

Accordingly, in operation P1040, an etching operation may be performed.

The etching operation may include dry and wet etching operations. The dry etching operation may be, for example, any one of reactive ion etching (RIE), deep RIE (DRIE), ion beam etching (IBE), and AR milling. In another example embodiment, the dry etching operation, which may be performed in the wafer W, may be atomic layer etching (ALE). In addition, the wet etching operation, which may be performed in the wafer W, may be an etching operation using at least one of $Cl_2$, HCl, $CHF_3$, $CH_2F_2$, $CH_3F$, $H_2$, $BCL_3$, $SiCl_4$, $Br_2$, HBr, $NF_3$, $CF_4$, $C_2F_6$, $C_4F_8$, $SF_6$, $O_2$, $SO_2$ and COS as an etchant gas.

Accordingly, in operation P1050, the wafer W may be inspected after etching. The ADI of the wafer W may include generating a super-resolution image of the wafer W, on which the etching operation is performed. The after etch inspection of the wafer W may include defects inspection such as particles, scratches, or the like, an inspection of linewidths and pitches of formed patterns, and the LER of the patterns.

In operation P1060, the wafer W may be cleaned.

The cleaning of the wafer W may be an operation removing particle contaminants such as by-products remaining after the etching operation. The cleaning of the wafer W may include, for example, wet cleaning.

In operation P1070, the wafer W may be inspected after cleaning. An after cleaning inspection of the wafer W may include generating a super-resolution image of the wafer W, on which the cleaning operation is performed. The after cleaning inspection of the wafer W may include inspecting whether particles remain on the wafer W after the cleaning operation.

While example embodiments have been described with reference to the figures, it will be understood by those of ordinary skill in the art that various changes in form and details may be made therein without departing from the spirit and scope as defined by the following claims.

What is claimed is:

1. A super-resolution holographic microscope comprising:
a light source configured to emit input light;
a diffraction grating configured to split the input light into first light and second light;
a mirror configured to reflect the first light;
a wafer stage arranged on an optical path of the second light and on which a wafer is configured to be arranged;
a camera configured to receive the first light reflected by the mirror and the second light reflected by the wafer to generate a plurality of hologram images of the wafer;
a processor configured to generate a super-resolution hologram image based on the plurality of hologram images,
wherein the plurality of hologram images are generated based on at least one of a position of the wafer and an angle of the mirror being different from each other, and each of the plurality of hologram images has a sampling wavenumber and a sampling bandwidth, the sampling wavenumber and the sampling bandwidth being determined based on a size of a pixel of the camera,
wherein the processor is further configured to Fourier-transform each of the plurality of hologram images to generate a plurality of wavenumber domain hologram images, and
wherein the processor is further configured to generate a wavenumber domain super-resolution hologram image generated by expanding the sampling bandwidth determined via the sampling wavenumber based on the plurality of wavenumber domain hologram images.

2. The super-resolution holographic microscope of claim 1, wherein the input light is directly incident on the diffraction grating.

3. The super-resolution holographic microscope of claim 1, wherein the first light provided from the diffraction grating is directly incident on the mirror.

4. The super-resolution holographic microscope of claim 1, wherein the second light provided from the diffraction grating is directly incident on the wafer.

5. The super-resolution holographic microscope of claim 1, wherein the diffraction grating is a transmissive-type.

6. The super-resolution holographic microscope of claim 1, wherein the diffraction grating is a reflective-type.

7. The super-resolution holographic microscope of claim 1, wherein the first light is zeroth-order diffracted light.

8. The super-resolution holographic microscope of claim 1, wherein the second light is first-order diffracted light.

9. The super-resolution holographic microscope of claim 1, wherein the wafer stage is configured to move the position of the wafer, and
wherein the camera is further configured to generate the plurality of hologram images corresponding to different positions of the wafer.

10. The super-resolution holographic microscope of claim 1, wherein the mirror is further configured to rotate at rotation angles, and
wherein the camera is further configured to generate the plurality of hologram images corresponding to the rotation angles of the mirror.

11. A super-resolution holographic microscope comprising:
a light source configured to generate input light and emit the input light that is generated;
a diffraction grating configured to receive the input light and output first diffracted light and second diffracted light;
a mirror configured to reflect the first diffracted light;
a wafer stage arranged on an optical path of the second diffracted light and on which a wafer is configured to be arranged;
a camera configured to receive the first diffracted light reflected by the mirror and the second diffracted light reflected by the wafer to generate a plurality of hologram images; and
a processor configured to generate a super-resolution hologram image based on the plurality of hologram images,
wherein a lens is not arranged on each of an optical path of the input light, an optical path of the first diffracted light, and the optical path of the second diffracted light,
wherein the plurality of hologram images are generated based on at least one of a position of the wafer and an angle of the mirror being different from each other, and each of the plurality of hologram images has a sampling wavenumber and a sampling bandwidth, the sampling wavenumber and the sampling bandwidth being determined based on a size of a pixel of the camera,
wherein the processor is further configured to Fourier-transform each of the plurality of hologram images to generate a plurality of wavenumber domain hologram images, and
wherein the processor is further configured to generate a wavenumber domain super-resolution hologram image generated by expanding the sampling bandwidth determined via the sampling wavenumber based on the plurality of wavenumber domain hologram images.

12. The super-resolution holographic microscope of claim 11, wherein a resolution of the super-resolution hologram image generated by the processor is greater than a resolution of the plurality of hologram images generated by the camera.

13. The super-resolution holographic microscope of claim 11, wherein the processor is further configured to Fourier-inverse-transform the wavenumber domain super-resolution hologram image to generate the super-resolution hologram image.

14. The super-resolution holographic microscope of claim 13, wherein the processor is further configured to Fourier-inverse-transform the super-resolution hologram image to generate a super-resolution image.

15. A super-resolution holographic microscope comprising:
a light source configured to generate input light and emit the input light that is generated;

a diffraction grating configured to receive the input light and output first diffracted light and second diffracted light;

a total-reflection mirror configured to reflect the first diffracted light;

a wafer stage arranged on an optical path of the second diffracted light and on which a wafer is configured to be arranged;

a camera configured to receive the first diffracted light reflected by the total-reflection mirror and the second diffracted light reflected by the wafer to generate a plurality of hologram images; and a processor configured to generate a super-resolution hologram image based on the plurality of hologram images, wherein a lens and a beam splitter are not arranged on each of an optical path of the input light, an optical path of the first diffracted light, and the optical path of the second diffracted light, wherein the plurality of hologram images are generated based on at least one of a position of the wafer and an angle of the total-reflection mirror being different from each other, and each of the plurality of hologram images has a sampling wavenumber and a sampling bandwidth, the sampling wavenumber and the sampling bandwidth being determined based on a size of a pixel of the camera, wherein the processor is further configured to Fourier-transform each of the plurality of hologram images to generate a plurality of wavenumber domain hologram images, and wherein the processor is further configured to generate a wavenumber domain super-resolution hologram image generated by expanding the sampling bandwidth determined via the sampling wavenumber based on the plurality of wavenumber domain hologram images.

16. The super-resolution holographic microscope of claim 15, wherein a beam width of the input light is constant.

17. The super-resolution holographic microscope of claim 15, wherein a beam width of the first diffracted light is constant.

18. The super-resolution holographic microscope of claim 15, wherein a beam width of the second diffracted light is constant.

19. The super-resolution holographic microscope of claim 15, wherein the input light, the first diffracted light, and the second diffracted light are not focused.

\* \* \* \* \*